US010289890B2

(12) United States Patent
Li

(10) Patent No.: US 10,289,890 B2
(45) Date of Patent: May 14, 2019

(54) CAPACITIVE FINGERPRINT SENSOR

(71) Applicant: MICROARRAY MICROELECTRONICS CORP., LTD, Suzhou (CN)

(72) Inventor: Yangyuan Li, Suzhou (CN)

(73) Assignee: MICROARRAY MICROELECTRONICS CORP., LTD, Suzhou (CN)

( * ) Notice: Subject to any disclaimer, the term of this patent is extended or adjusted under 35 U.S.C. 154(b) by 0 days.

(21) Appl. No.: 15/918,766

(22) Filed: Mar. 12, 2018

(65) Prior Publication Data
US 2018/0225496 A1 Aug. 9, 2018

Related U.S. Application Data

(63) Continuation of application No. 15/109,626, filed as application No. PCT/CN2015/070077 on Jan. 5, 2015, now Pat. No. 9,953,200.

(30) Foreign Application Priority Data

Jan. 6, 2014 (CN) .......................... 2014 1 0004072

(51) Int. Cl.
*G06K 9/00* (2006.01)
(52) U.S. Cl.
CPC ................... *G06K 9/0002* (2013.01)
(58) Field of Classification Search
CPC .......... G06K 9/00–9/0012; G01B 7/00; G01B 7/004; G01B 7/28; G01B 7/287;
(Continued)

(56) References Cited

U.S. PATENT DOCUMENTS 4,353,056 A 10/1982 Tsikos
5,828,773 A 10/1998 Setlak et al.
(Continued)

FOREIGN PATENT DOCUMENTS

CN 103714330 4/2009
CN 102954753 A 3/2013
(Continued)

OTHER PUBLICATIONS

International Search Report for PCT/CN2015/070077 dated Apr. 8, 2015 and its English translation provided by WIPO.
(Continued)

*Primary Examiner* — Huy Q Phan
*Assistant Examiner* — David B Frederiksen
(74) *Attorney, Agent, or Firm* — Ladas & Parry, LLP

(57) ABSTRACT

On the basis of the physical principle that a capacitance value is inversely proportional to the distance between capacitive electrodes, the spatial structure of the surface of an object can be imaged by measuring a coupling capacitance between the surface of measured object and the electrode arrays on a surface of a sensor; for example, imaging may be performed to uneven spaces between ridge lines and valley lines of fingerprints. The present application provides a C-Q-T type capacitive fingerprint sensor. Firstly, coupling capacitance differences between the fingerprints and the electrodes of the sensor are converted into charge quantity differences, then the charge quantity differences are converted into time differences, and edge signals carrying the time differences are output. Fingerprint sensors are grouped into an array, reading and data combination may be performed to the edge signals, and imaging may be performed to fingerprints.

16 Claims, 7 Drawing Sheets

(58) Field of Classification Search
CPC ...... G06F 3/041; G06F 3/0412; G06F 3/0416; G06F 3/044; G01R 27/26; G01R 27/2605
See application file for complete search history.

(56) References Cited

U.S. PATENT DOCUMENTS

| | | | |
|---|---|---|---|
| 7,099,497 B2 | 8/2006 | Chou et al. | |
| 7,298,875 B2* | 11/2007 | Kim | G06K 9/0002 382/124 |
| 9,953,200 B2* | 4/2018 | Li | G06K 9/0002 |
| 2003/0016849 A1* | 1/2003 | Andrade | G01L 1/146 382/124 |
| 2006/0076963 A1 | 4/2006 | Miyasaka | |
| 2006/0138574 A1 | 6/2006 | Saito et al. | |
| 2007/0092117 A1 | 4/2007 | Qi | |
| 2008/0069413 A1 | 3/2008 | Riedijk et al. | |
| 2008/0208495 A1 | 8/2008 | Xu et al. | |
| 2009/0009485 A1 | 1/2009 | Bytheway | |
| 2012/0075239 A1* | 3/2012 | Azumi | G06F 3/044 345/174 |
| 2012/0081328 A1* | 4/2012 | Kandziora | G06F 3/0412 345/174 |
| 2012/0182028 A1* | 7/2012 | Oya | G06F 3/0416 324/684 |
| 2013/0082977 A1* | 4/2013 | Noguchi | G06F 3/044 345/174 |
| 2013/0181946 A1 | 7/2013 | Lee et al. | |
| 2014/0354587 A1* | 12/2014 | Mohindra | G06F 3/044 345/174 |
| 2016/0328592 A1 | 11/2016 | Li et al. | |

FOREIGN PATENT DOCUMENTS

| | | |
|---|---|---|
| CN | 102957404 | 3/2013 |
| EP | 2508874 | 10/2012 |

OTHER PUBLICATIONS

Written Opinion for PCT/CN2015/070077 dated Apr. 8, 2015 and its English translation.
International Preliminary Report on Patentability (Chapter 1) for PCT/CN2015/070077 dated Jul. 12, 2016 and its English translation.
Notice of Allowance for U.S. Appl. No. 15/109,626, dated Dec. 21, 2017 (published as US 2016/0328592).
Non-Final Rejection for U.S. Appl. No. 15/109,626, dated Jul. 5, 2017 (published as US 2016/0328592).

* cited by examiner

CAPACITIVE FINGERPRINT SENSOR

CROSS REFERENCE OF THE RELATED APPLICATIONS

This application claims the benefit of and is a continuation of U.S. patent application Ser. No. 15/109,626 filed on Jul. 1, 2016, which is the U.S. national phase of PCT application No. PCT/CN/2015/070077 filed on Jan. 5, 2015, which claims priority to the Chinese patent application No. 201410004072.3, filed on Jan. 6, 2014 and with the title of "Capacitive Fingerprint Sensor", the disclosures of which are incorporated herein by reference in their entireties.

TECHNICAL FIELD

This application relates to a capacitive fingerprint sensor, and particularly to a capacitive fingerprint sensor that may form an array for imaging fingerprints.

BACKGROUND ARTS

The technology of imaging fingerprints by measuring the differences between the coupling capacitance formed between ridgelines of fingerprints and planar sensing electrode array units and that formed between valley lines of the fingerprints and the planar sensing electrode array units is first seen in the patent application U.S. Pat. No. 4,353,056A (Siemens, 1980). Over the past 30 years, sensor technologies for imaging fingerprints based on the measurement of coupling capacitances are continuously developed. Famous enterprises involving this filed include Siemens, AT & T Bell, Philips, Toshiba, ST, NEC, Motorola, Sharp, Intel, Epson and countless venture capital companies.

Most of the capacitive fingerprint sensor technologies are developed based on macro-capacitive sensor circuit prototypes. However, the technical laws of sensors determine that capacitive sensors area combination of circuits and sensor equations, and the circuit scales and the implementation processes of circuits determine the value ranges and the tolerance ranges of various parameters in the sensor equations. When the technical solutions originally formed by macro-scale electronic components are formed by micro-scale electronic components instead, most of such technical solutions will deteriorate in sensitivity and performance in noise characteristics.

Further, capacitive fingerprint sensors as array sensors are also sensitive to the mismatching among the units, which is more difficult to control for micro-scale electronic components with respect to macro-scale electronic components. Meanwhile, since a measurement circuit is often large in size, array sensors are generally designed for single-channel, and the respective units reuse the measurement circuit in a time division manner. In order to ensure a certain image frame rate, prolonging the sampling time, which is an important method for improving signal gain in the design of array sensors, is greatly limited, or even becomes unfeasible for a single-channel array sensor with a relatively large number of points.

Such technical restrictions determine that only a handful of technical routes have the potential to move towards commercialization, and such technical routes that do not meet objective technical laws will move towards extinction. By 2013, there are three types of capacitive fingerprint sensors with certain scale of application: a radio frequency response type, which measures the amplitude of a reflected RF signal, may be represented by a US company Authentec (U.S. Pat. No. 5,828,773A) acquired by Apple Inc. in 2012, and is mainly used iniPhone5S of Apple Inc.; a transient response type, which measures a transient coupling level, may be represented by a Swedish company Fingerprint Cards (US20080069413A1), and is mainly used in the teller systems of China's state-owned banks; and a charge transfer type, which may be represented by a China's Taiwanese company Egistec (U.S. Pat. No. 7,099,497B2), and is mainly used in ideaPad of Lenovo company. The former two types are called as active types in the industry, and the third type a passive type. The common feature of the three types is that a capacitance is converted into a voltage for measurements. From the view of classification of sensors, these three types are classified as "C-V" type sensors.

In recent years, in CMOS photosensors with millions of pixels, to meet the requirements for growing image point numbers, such photosensors develop from single-channel photosensors to multi-channel ones. The so-called multi-channel array sensor, in fact, is a plurality of independent single-channel array sensors combined spatially. Taking into account the limitations of the actual circuit layout, as the number of measurement circuits changes from one into a plurality, the sizes of the measurement circuits must be greatly reduced. A "V-T" ADC is a new analog-digital converter. Compared with a direct type ADC, a "V-T" ADC has the advantage of a greatly reduced circuit scale under the same resolution requirement, and has the disadvantage of longer sampling and holding time. Multi-channel CMOS sensors tend to adopt "V-T" converters, and balance among the number of channels, the sampling and holding time and the circuit size so as to determine the best design solution.

The invention patent application filed by Chengdu Microarray Electronic Co., Ltd. in 2012 with the title of "capacitive distance sensor" and the application number of CN201210403271.2 discloses a novel" C-V-T "type capacitive distance sensor. The method adopted by the above sensor is as below: fingerprints are placed on the surface of an object to be measured (equivalent to the target electrode); a measuring capacitance (equivalent to the target capacitance) is formed by coupling between the capacitance measuring plate (equivalent to the sensing electrode) and the surface of an object to be measured; the distances from the surface of the object to be measured (equivalent to the target electrode) to the capacitance measuring plates (equivalent to the sensing electrode) of different array units are different, and so do the measuring capacitances (equivalent to the target capacitance) formed by coupling; a capacitive coupling plate (equivalent to the driving electrode) is driven by a first programmable level generator (equivalent to the level driver) so that the potentials of the capacitance measuring plates (equivalent to the sensing electrode) increase, and the increase degrees of the potentials are different as the measuring capacitance (equivalent to the target capacitance) connected in parallel are different; a reference capacitor (equivalent to the integrating capacitor) is first fully charged, and then discharges to the capacitance measuring plates (equivalent to the sensing electrode) with increased levels; and the discharging degrees are different as the potentials of the capacitance measuring plates (equivalent to the sensing electrode) are different; discharging is repeated so that the potential of the reference capacitor (equivalent to the integrating capacitor) is continuously decreased; as the decrease rates are different, the time for generating a threshold level by a second level generator (equivalent to the reference level) is different, so that the comparator outputs flip at different timings; the number of discharging times corresponding to the time the comparator outputs the flip is an output of the capacitive distance sensor.

The measuring function of the sensor is deemed as "S-C-V-T". That is, a distance from the fingerprints to a sensing electrode is an independent variable, and the counted value in the time direction is the value of the function. The measuring function has the advantages of anti-shifting and linearity. By taking advantage of improved resolution and reduced thermal noise, the sensor has greatly improved performance. Tape-out verification results show that the technical level of the sensor is higher than the internationally advanced level in 2012 under the same process conditions, but lower than the internationally advanced level in 2013 or the technical level of Touch ID sensors installed in iPhone5S.

Due to active research, development and application of fingerprint sensor technologies by Apple Inc., the consumer electronics market has huge demand and higher requirements for fingerprint sensor technologies. The present application has improved the technical solution disclosed by the patent application CN201210403271.2 by establishing and analyzing equations for the sensitivity of sensors. The present application has introduced more items and corresponding circuits for increasing sensitivity, while proposing general models for some circuits and simplifying some circuits.

SUMMARY

One objective of the present application is to provide a capacitive fingerprint sensor with improved sensitivity compared with the capacitive distance sensor disclosed in the patent application CN201210403271.2.

To realize the above objective, the present application provides a "C-Q-T" type capacitive sensor circuit including a "C-Q" converter and a "Q-T" converter. The objective of fingerprint imaging is to perform fingerprint recognition, and what is concerned is spatial difference among fingerprint ridge lines and fingerprint valley lines. The spatial difference component is first converted into a fingerprint, and is used as a difference of a target capacitance Cg formed by coupling between the target electrode Pg and the sensing electrode Ps. The capacitance value difference is converted by the "C-Q" converter into a difference in an amount of charge on the sensing electrode Ps. The "Q-T" converter sequentially transfers the charges on the sensing electrode Ps to the integrating capacitor Ct, so that the integrating capacitor Ct is charged/discharged, and the charge amount difference is converted into a difference in charging/discharging rates. As the charging/discharging rates are different, the number of charging/discharging times by which the potential Vt of the integrating capacitor Ct changes from an initial level to a threshold level Vref3 are different. The comparator compares the Vt and the Vref3. The number of charge transfers corresponding to the time points at which transition edges occur at the output terminal of the comparator is the quantized capacitance value. The transition edge is output at the output terminal of the comparator according to the capacitive fingerprint sensor of the present application, read out by a corresponding reading circuit, and converted to the number of charge transfer times. The "edge time readout circuit" disclosed by the patent application filed by Chengdu Microarray Electronic Co., Ltd. in 2012 with the title of "capacitive distance sensor" and the application number of CN201210405080.X may be used for this purpose.

The "C-Q" converter includes: a target electrode Pg (fingerprints), a sensing electrode Ps, a driving electrode Pd, a first level driver, a second level driver, a first initialization switch and a first reference level. The capacitor coupling the sensing electrode Ps and the target electrode Pg is called a target capacitor Cg. The capacitor coupling the sensing electrode Ps and the driving electrode Pd is called a driving capacitor Cd. The capacitor coupling the sensing electrode Ps and a background circuit (such as a substrate) is called a background capacitor Cb. As the background capacitor Cb and the driving capacitor Cd are located inside the sensor and are connected in parallel, to simplify the presentation, the background capacitor Cb is regarded as a part of the driving capacitor Cd, and a voltage on the driving capacitor Cd is regarded as an average of the voltages of the background capacitor Cb and the driving capacitor Cd weighted by their respective capacitance values. A first port of the first initialization switch is connected to the sensing electrode Ps, the first level driver to the target electrode Pg, the second level driver to the driving electrode Pd, the first reference level outputs an initialization level Vref1 and is connected to a second port of the first initialization switch. The control logic time sequence of the "C-Q" converter is as below:

Step 1-1: the first level driver outputs a level V11 to the target electrode Pg; the second level driver outputs a level V21 to the driving electrode Pd;

Step 1-2: turn on the first initialization switch, and connect the sensing electrode Ps to the first reference level;

Step 1-3: turn off the first initialization switch;

Step 1-4: the first level driver outputs a level V21 to the target electrode Pg; the second level driver outputs a level V22 to the driving electrode Pd;

Step 1-5: return to Step 1-1.

In Step 1-2, the potential of the sensing electrode Ps is the initialization level Vref1.

In Step 1-4, as the sensing electrode Ps is suspended in the air, the potential changes of the target electrode Pg and the driving electrode Pd couple the charges into the sensing electrode Ps. The potential of the sensing electrode Ps at the time in Step 1-4 is defined as Vs; then, according to the law of charge conservation, the following equation holds:

$$(Vref1-V11)*Cg+(Vref1-V21)*Cd=(Vs-V12)*Cg+(Vs-V22)*Cd \quad (1).$$

The Equation (1) may be converted into:

$$(Vs-Vref1)*(Cd+Cg)=(V12-V11)*Cg+(V22-V21)*Cd \quad (2).$$

It is defined that $\Delta V1=V12-V11$, $\Delta V2=V22-V21$, and $$Vs-Vref1=(\Delta V1*Cg+\Delta V2*Cd)/(Cd+Cg) \quad (3).$$

To facilitate the substitution, the Equation (3) may be converted into an expression form of Vs:

$$Vs=(\Delta V1*Cg+\Delta V2*Cd)/(Cd+Cg)+Vref1 \quad (4).$$

The "Q-T" converter includes: the integrating capacitor Ct, the second initialization switch, the second reference level, the charge transfer switch, the comparator and the third reference level. The integrating capacitor Ct is connected to a first port of the second initialization switch, a second port of the charge transfer switch and a first input terminal of the comparator. The second reference level outputs an initialization level Vref2, and is connected to a second port of the initialization switch. A first port of the charge transfer switch is connected to the sensing electrode Ps of the "C-Q" converter. The third reference level outputs a threshold level Vref3, and is connected to a second input terminal of the comparator. The control logic time sequence of the "Q-T" converter is as below:

Step 2-1: turn on the second initialization switch, and connect the integrating capacitor Ct to the second reference level;

Step 2-2: turn off the second initialization switch;
Step 2-3: if the "C-Q" converter is in Step 1-4, lock the "C-Q" converter in Step 1-4;
Step 2-4: turn on the charge transfer switch;
Step 2-5: turn off the charge transfer switch;
Step 2-6: release locking of the "C-Q" converter;
Step 2-7: if the "C-Q" converter leaves Step 1-4, return to Step 2-3.

The first input terminal of the comparator is connected to the integrating capacitor Ct, the second input terminal of the comparator to the third reference level, so that the potential Vt of the integrating capacitor Ct is compared with the threshold level Vref3 output by the third reference level, and a comparison result is output as an output of the "Q-T" converter or an output of the "C-Q-T" converter.

The time information T carried by the output of the sensor is an integration result of a charge transfer iterative process; T (Cg) does not have a strong solution, and a weak solution expression formula has no analysis value, and can only be analyzed by indirect expression formulas. The level of the integrating capacitor Ct is defined as Vt. Vt changes gradually from Vref2 to Vs. The value of T (Cg) is taken such that the integration of Vt' (Cg) on T is the interval length of δ (Vs−Vref2), where δ<1. For a given quantized bit length, T' (Cg) cannot be increased by indefinitely increasing T (Cg), so the relative value of T' (Cg)/T (Cg) should be increased. Since the highest order term of the weak solution of the mapping from Vt' (Cg) to T (Cg) is an exponential decreasing function, the mapping from Vt' (Cg) to T (Cg) is a monotonic decreasing function and the mapping from Vt" (Cg) to T' (Cg) is also a monotonic decreasing function. Vt" (Cg)Vt' (Cg) may be used to replace T' (Cg)/T (Cg) for sensitivity analysis.

Order the integrating capacitor Ct becomes Vt+Vt' from Vt via charge transfer for once. Due to the law of conservation of charge, the following equation holds:

$$(Vt+Vt')*(Ct+Cd+Cg)=Vt*Ct+Vs*(Cd+Cg) \quad (5),$$

which may be converted into:

$$Vt'=(Vs-Vt)*(Cd+Cg)/(Ct+Cd+Cg) \quad (6).$$

The equation (4) is substituted into equation (6) to obtain:

$$Vt'(Cg)=((\Delta V2+Vref1-Vt)*Cd+(\Delta V1+Vref1-Vt)*Cg)/(Ct+Cd+Cg) \quad (7).$$

By obtaining the derivation of Cg, the equation (7) is simplified into:

$$Vt''(Cg)=((\Delta V1+Vref1-Vt)*Ct+(\Delta V1-\Delta V2)*Cd)/(Ct+Cd+Cg)^2 \quad (8).$$

The influence direction and order over Vt' (Cg) and Vt" (Cg) by changes in a single variable can be determined from equations (7) and (8). The influence over Vs−Vref2 should be taken into account at the same time, so that Vs−Vref2 is kept within a suitable range and the value range of T (Cg) is desirable.

$$Vs-Vref2=(\Delta V1*Cg+\Delta V2*Cd)/(Cd+Cg)+Vref1-Vref2 \quad (9).$$

With reference to the analysis of equations (7), (8) and (9), and considering the characteristics of micro-electronic components, technology platform characteristics and various design constraints, circuit design solutions can be optimized. The equation characteristics relating to circuit configurations are as follows.

Generally, Ct>>Cd; if the target capacitance is extremely small, Cd>>Cg. ΔV1 is a major item that affects the numerator in equation (8) (based on Ct>>Cd), while it is a minor item that affects the numerators in equations (7) and (9). Therefore, by increasing ΔV1, the sensitivity of the sensor can be improved significantly. Compared with the technical solution of CN201210403271.2, the most important technical improvement is that the first level driver is introduced to couple charges from the target electrode Pg to the sensing electrode Ps. Compared with the case where ΔV1==0, the equation (8) is approximately increased by (ΔV1+Vref1−Vt)/(Vref1−Vt) times.

Equations (7), (8) and (9) only record ΔV1 and ΔV2, which are not related to the absolute values of V11, V12, V21 and V22. Therefore, direct current can be separated by capacitors and only alternating current (AC) components can be passed between the first level driver and the target electrode Pg, and between the second level driver and the driving electrode Pd. In particular, the target electrode Pg may acquire a ΔV1 AC component. The same effect can be achieved by coupling the sensor ground level with an AC level component reverse to ΔV1.

After analyzing equations (7), (8) and (9), it is concluded that the influence of ΔV2 is far smaller than that of ΔV1, and even if ΔV2 is constantly equal to 0, the decrease in sensitivity of the sensor is quite small. Therefore, the present application allows the second level driver to be connected to the sensor ground level. This is the essential difference between a "C-Q" type sensor and a "C-V" type sensor. If the first programmable level generator of the circuit disclosed by CN201210403271.2, which corresponds to the second level driver of the present application, is also connected to the sensor ground level, the "C-V" section will always output a ground level.

By establishing and analyzing sensor equations, the inventor has proposed the circuit implementation solution and the implementation scope of a "C-Q-T" type capacitive fingerprint sensor. The capacitive fingerprint sensor of the present application is configured to form an array for imaging fingerprints, wherein when a group is formed in a single-channel form, a plurality of "C-Q" converters reuse one "Q-T" converter in a time division manner, and when a group is formed in a multi-channel form, a plurality of single-channel "C-Q-T" sensor groups work in parallel.

DETAILED DESCRIPTION

Figure 1:
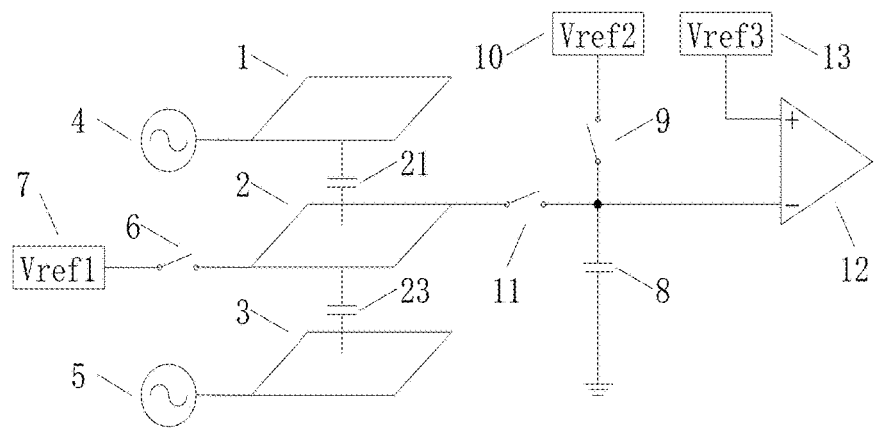
FIG. 1 is a circuit diagram of the capacitive fingerprint sensor of the present application.

As shown in FIG. 1, the circuit provided by the present application includes: a target electrode 1, a sensing electrode 2, a driving electrode 3, a first level driver 4, a second level driver 5, a first initialization switch 6, a first reference level 7, an integrating capacitor 8, a second initialization switch 9, a second reference level 10, a charge transfer switch 11, a comparator 12 and a third reference level 13, wherein:

the sensing electrode 2 comprises one or more sensing electrodes, and is connected to a first port of the first initialization switch 6 and a first port of the charge transfer switch 11;

the target electrode 1 is a surface of a target to be measured, is connected to the first level driver 4 and is positioned above the sensing electrode 2, wherein a target capacitance 21 is formed between the target electrode 1 and the sensing electrode 2;

the driving electrode 3 includes one or more driving electrodes, is connected to the second level driver 5 and is positioned below the sensing electrode 2, wherein a dielectric layer is formed between the driving electrode 3 and the sensing electrode 2, and a driving capacitance 23 is formed between the driving electrode 3 and the sensing electrode 2;

the first level driver 4 is connected to the target electrode 1;

the second level driver 5 is connected to the driving electrode 3;

the first port of the first initialization switch 6 is connected to the sensing electrode 2, and a second port of the first initialization switch 6 to the first reference level 7;

the first reference level 7 is connected to the second port of the first initialization switch 6;

the integrating capacitor 8 includes one capacitor or a plurality of capacitors connected in parallel, and is connected to a first port of the second initialization switch 9, a second port of the charge transfer switch 11 and a first input terminal of the comparator 12;

the first port of the second initialization switch 9 is connected to the integrating capacitor 8, and a second port of the second initialization switch 9 to the second reference level 10;

the second reference level 10 is connected to the second port of the second initialization switch 9;

the first port of the charge transfer switch 11 is connected to the sensing electrode 2, and the second port of the charge transfer switch 11 to the integrating capacitor 8;

the first input terminal of the comparator 12 is connected to the integrating capacitor 8, a second input terminal of the comparator 12 to the third reference level 13, and an output terminal of the comparator 12 is an output terminal of the sensor; and the third reference level 13 is connected to the second input terminal of the comparator 12.

Figure 2:
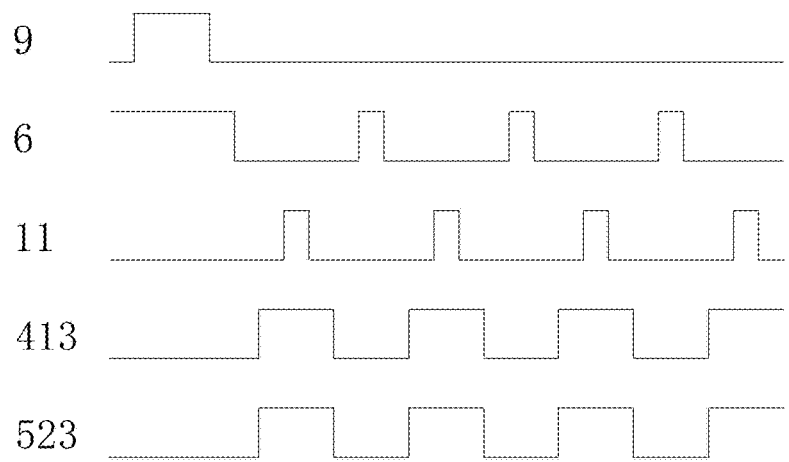
FIG. 2 is a diagram showing the switch control signals and level control signals of the present application.

FIG. 2 shows the time sequence between the switch control signal and the level control signal:

Step 1: turn on the first initialization switch 6, turn off the charge transfer switch 11, turn off the second initialization switch 9, set a first level control signal 413 to low and set a second level control signal 523 to low;

Step 2: turn on the second initialization switch 9;
Step 3: turn off the second initialization switch 9;
Step 4: turn off the first initialization switch 6;

Step 5: set the first level control signal 413 to high and set the second level control signal 523 to high;
Step 6: turn on the charge transfer switch 11;
Step 7: turn off the charge transfer switch 11;
Step 8: set the first level control signal 413 to low and set the second level control signal 523 to low;
Step 9: turn on the first initialization switch 6;
Step 10: return to Step 4.

Figure 3:
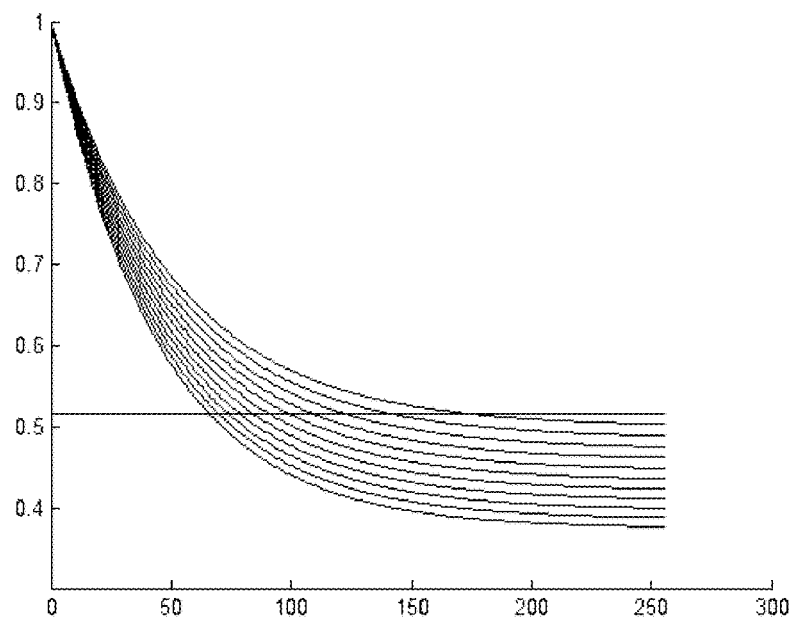
FIG. 3 is a diagram showing the comparison between the potential curve family of the integrating capacitor and the threshold level of the present application.

FIG. 3 is a diagram showing the comparison between the potential curve family of the integrating capacitor 8 and the third reference level 13. The values of the target capacitance 23 are different, so that the potential change curves of the integrating capacitor 8 fall in different curves shown in the curve family, and projections of the intersecting points between the potential change curve of the integrating capacitor 8 and the third reference level 13 on the time axis are different. The comparator 12 compares the two, flips at the intersecting time point shown in FIG. 3 and outputs a transition edge.

Figure 4:
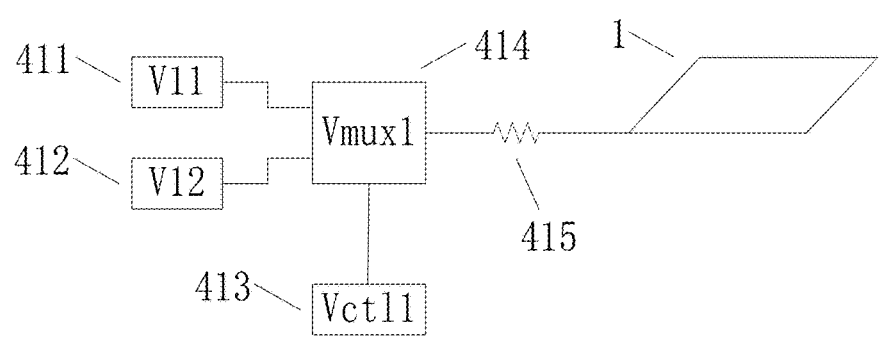
FIG. 4 shows a first embodiment of the first level driver of the present application.

FIG. 4 shows a first embodiment of the first level driver 4 of the present application. The first level driver 4 includes an input level V11 411, an input level V12 412, a first level control signal 413, a first level selector 414 and a resistor 415. The input level V11 411 is connected to a first input terminal of the first level selector 414; the input level V12 412 to a second input terminal of the first level selector 414; the first level control signal 413 to a control terminal of the first level selector 414; an output terminal of the first level selector 414 to a first port of the resistor 415; and a second port of the resistor 415 to the target electrode 1.

The first level selector 414 outputs a first input terminal level when the first level control signal 413 is low, and outputs a second input terminal level when the first level control signal 413 is high.

Figure 5:
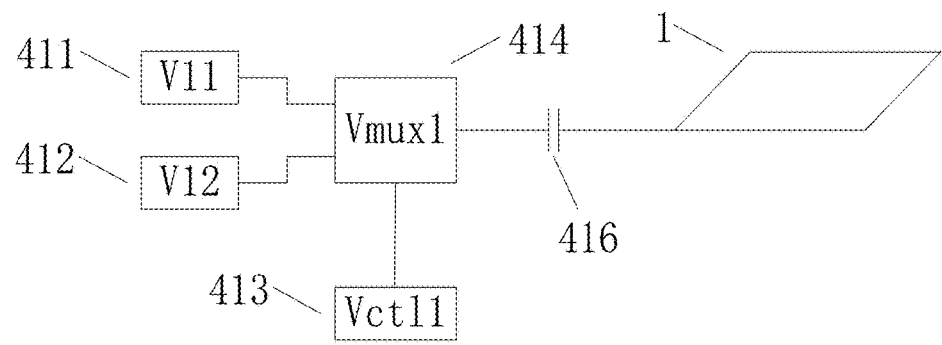
FIG. 5 shows a second embodiment of the first level driver of the present application.

FIG. 5 shows a second embodiment of the first level driver 4 of the present application. The first level driver 4 includes the input level V11 411, the input level V12 412, the first level control signal 413, the first level selector 414 and a capacitor 416. The input level V11 411 is connected to the first input terminal of the first level selector 414; the input level V12 412 to the second input terminal of the first level selector 414; the first level control signal 413 to the control terminal of the first level selector 414; the output terminal of the first level selector 414 to a first electrode of the capacitor 416; and a second electrode of the capacitor 416 to the target electrode 1.

The first level selector 414 outputs the first input terminal level when the first level control signal 413 is low, and outputs the second input terminal level when the first level control signal 413 is high.

Figure 6:
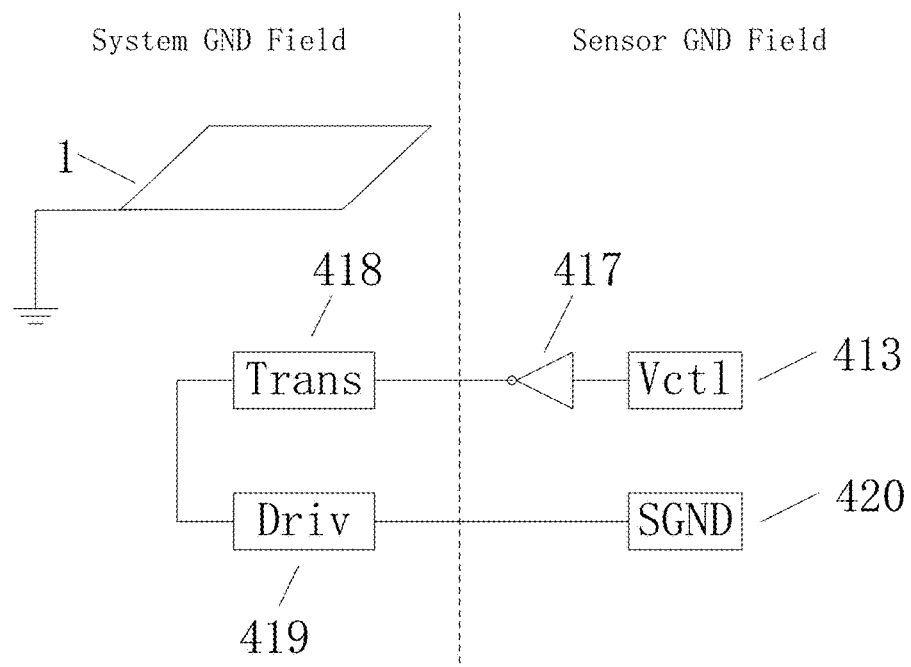
FIG. 6 shows a third embodiment of the first level driver of the present application.

FIG. 6 shows a third embodiment of the first level driver 4 of the present application. The first level driver 4 includes the first level control signal 413, a phase inverter 417, a signal converter 418, a driving circuit 419 and a sensor ground level input terminal 420. The first level control signal 413 is connected to an input terminal of the phase inverter 417; an output terminal of the phase inverter 417 to an input terminal of the signal converter 418; an output terminal of the signal converter 418 to a control terminal of the driving circuit 419; an output terminal of the driving circuit 419 to the sensor ground level input terminal 420; and the target electrode 1 is suspended in the air or grounded.

The signal converter 418 is configured to convert an input signal from a sensor ground level domain to a system ground level domain.

The driving circuit 419 is configured to amplify an input terminal level and provide driving at the output terminal.

Figure 7:
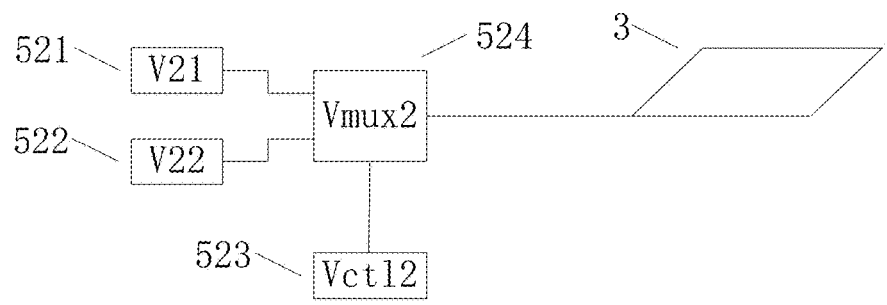
FIG. 7 shows a first embodiment of the second level driver of the present application.

FIG. 7 shows a first embodiment of the second level driver 5 of the present application. The second level driver 5 includes an input level V21 521, an input level V22 522, a second level control signal 523 and a second level selector 524. The input level V21 521 is connected to a first input terminal of the second level selector 524; the input level V22 522 to a second input terminal of the second level selector 524; the second level control signal 523 to a control terminal of the second level selector 524; and an output terminal of the second level selector 524 to the driving electrode 3.

The second level selector 524 outputs a first input terminal level when the second level control signal 523 is low, and outputs a second input terminal level when the second level control signal 523 is high.

Figure 8:
FIG. 8 shows a second embodiment of the second level driver of the present application.

FIG. 8 shows a second embodiment of the second level driver 5 of the present application. The second level driver 5 includes the input level V21 521. The input level V21 521 is connected to the driving electrode 3.

Figure 9:
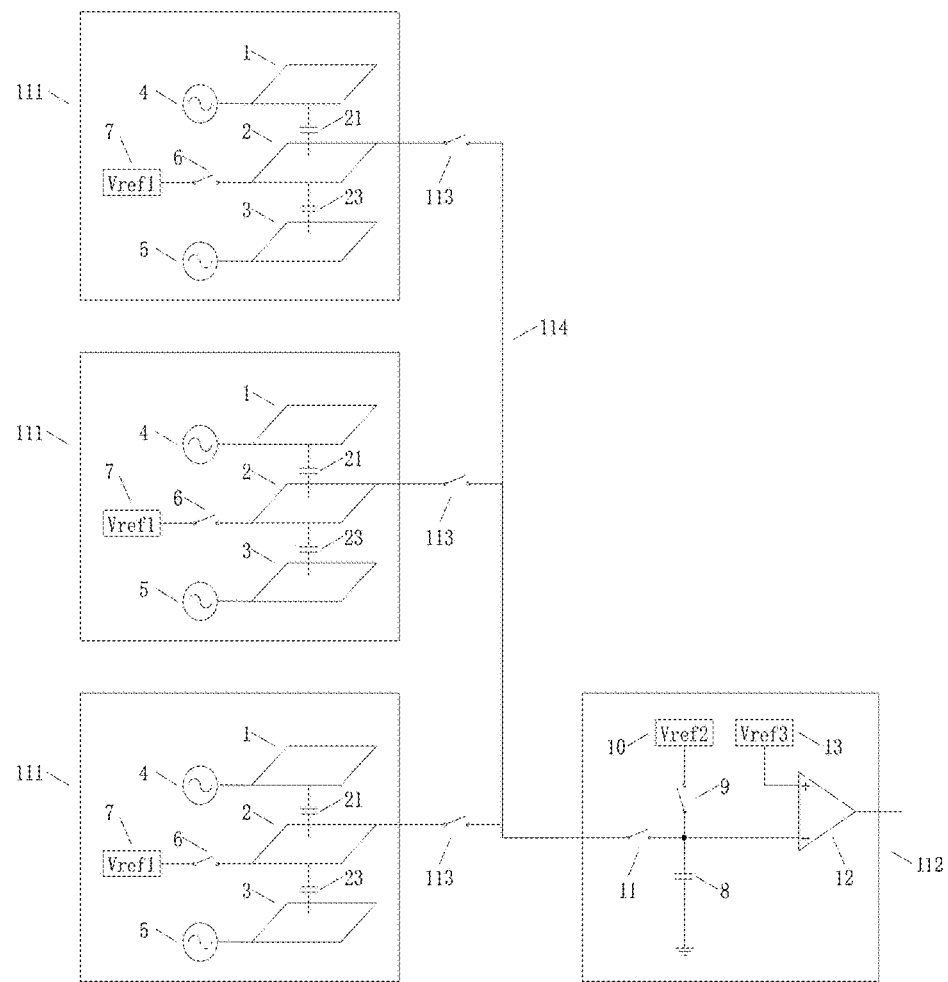
FIG. 9 is a first diagram showing the grouping of the capacitive fingerprint sensor of the present application.

FIG. 9 is a first diagram showing the grouping of the capacitive fingerprint sensor of the present application. The target electrode 1, the sensing electrode 2, the driving electrode 3, the first level driver 4, the second level driver 5, the first initialization switch 6 and the first reference level 7 form a first unit circuit 111; and the integrating capacitor 8, the second initialization switch 9, the second reference level 10, the charge transfer switch 11, the comparator 12 and the third reference level 13 form a first reused circuit 112, wherein: the first unit circuit 111 is connected to a first port of a first group of selectable switches 113, a second port of the first group of selectable switches 113 to a first bus 114, and the first bus 114 to the first reused circuit 112.

The first group of selectable switches 113 is a one-dimensional or two-dimensional switch group, and at most one switch is turned on at any time.

Figure 10:
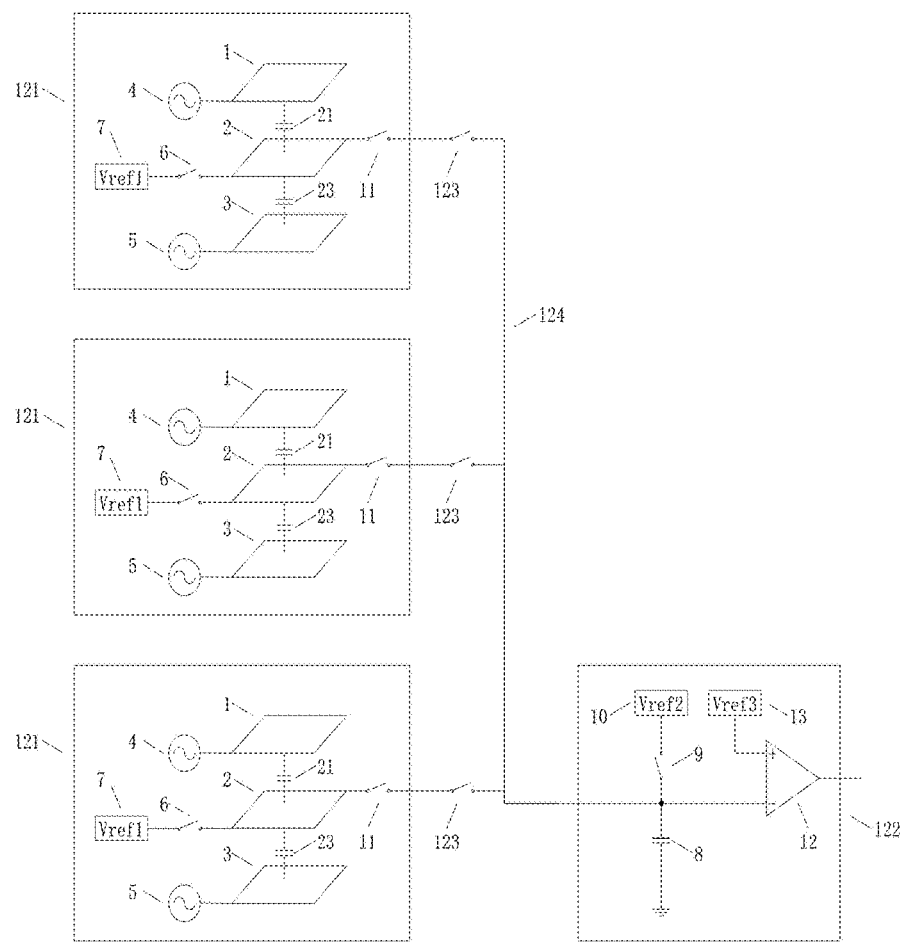
FIG. 10 is a second diagram showing the grouping of the capacitive fingerprint sensor of the present application.

FIG. 10 is a second diagram showing the grouping of the capacitive fingerprint sensor of the present application. The target electrode 1, the sensing electrode 2, the driving electrode 3, the first level driver 4, the second level driver 5, the first initialization switch 6, the first reference level 7 and the charge transfer switch 11 form a second unit circuit 121; and the integrating capacitor 8, the second initialization switch 9, the second reference level 10, the comparator 12 and the third reference level 13 form a second reused circuit 122, wherein: the second unit circuit 121 is connected to a first port of a second group of selectable switches 123, a second port of the second group of selectable switches 123 to a second bus 124, and the second bus 124 to the second reused circuit 122.

The second group of selectable switches 123 is a one-dimensional or two-dimensional switch group, and at most one switch is turned on at any time.

Figure 11:
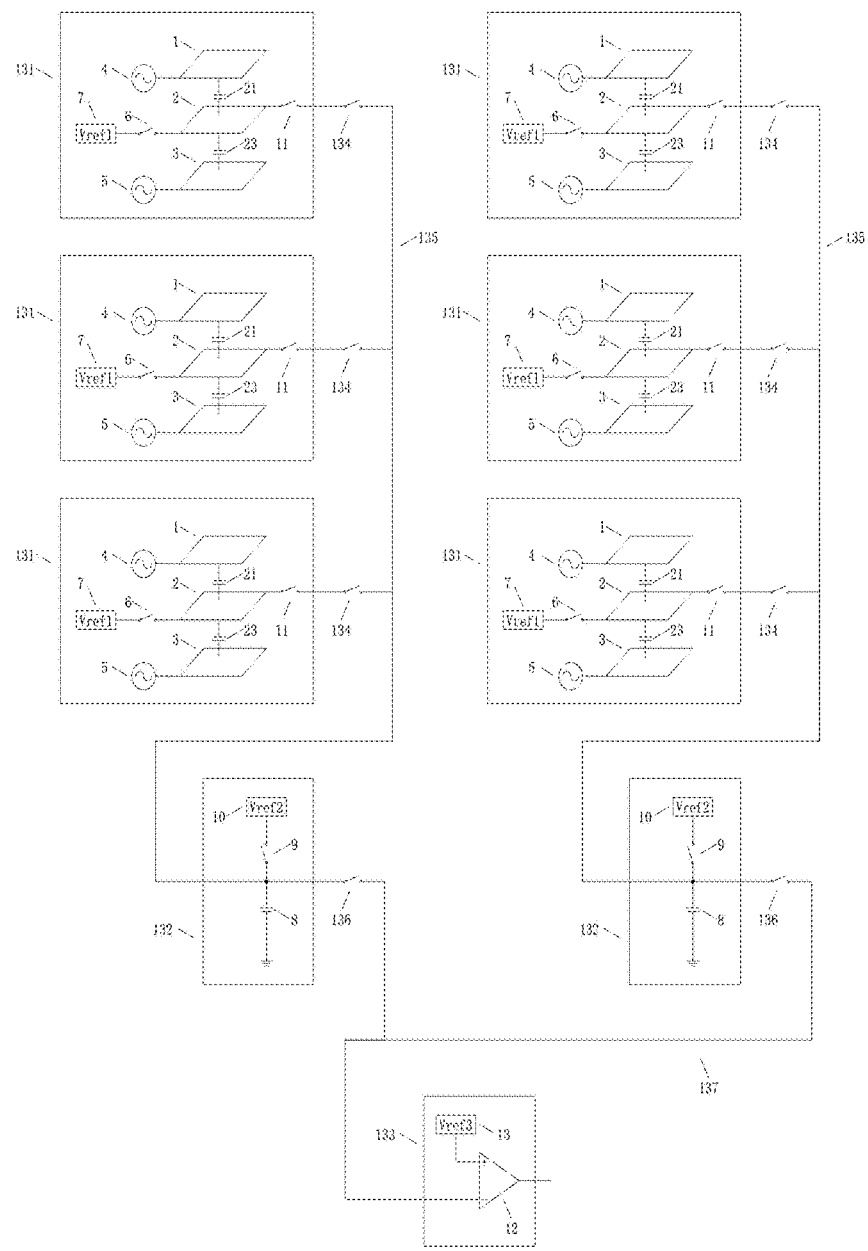
FIG. 11 is a third diagram showing the grouping of the capacitive fingerprint sensor of the present application.

FIG. 11 is a third diagram showing the grouping of the capacitive fingerprint sensor of the present application. The target electrode 1, the sensing electrode 2, the driving electrode 3, the first level driver 4, the second level driver 5, the first initialization switch 6, the first reference level 7 and the charge transfer switch 11 form a third unit circuit 131; the integrating capacitor 8, the second initialization switch 9 and the second reference level 10 form a primary reused circuit 132; and the comparator 12 and the third reference level 13 form a secondary reused circuit 133, wherein: the third unit circuit 131 is connected to a first port of a primary group of selectable switches 134, a second port of the primary group of selectable switches 134 to a third bus 135, the third bus 135 to the primary reused circuit 132, the primary reused circuit 132 to a first port of a secondary group of selectable switches 136, a second port of the secondary group of selectable switches 136 to a fourth bus 137, and the fourth bus 137 to the secondary reused circuit 133.

The primary group of selectable switches 134 includes a plurality of one-dimensional switch groups, and at most one switch is turned on for each switch group at any time.

The secondary group of selectable switches 136 is a one-dimensional switch group, and at most one switch is turned on at any time.

The secondary reused circuit 133 may comprise a plurality of comparators 12 paired with respective third reference levels 13. The respective third reference levels are different from each other.

The present application is not limited to the above embodiments, but includes all the combinations for realizing the disclosed circuit, which may be inferred based on the principle discussed in the present description. All modifications made within the spirit of the present application and the scope of the claims shall fall into the scope of the present application.

The invention claimed is:

1. A capacitive fingerprint sensor, comprising: a sensing electrode, a driving electrode, a first level driver, a second level driver, a first initialization switch, a first reference level and a charge transfer switch, wherein:
   the sensing electrode comprises one or more sensing electrodes, and is connected to a first port of the first initialization switch and a first port of the charge transfer switch;
   wherein a target capacitance is formed between a target electrode and the sensing electrode, the target electrode is a surface of a target to be measured and is positioned above the sensing electrode, wherein the target electrode is suspended in air or grounded and a dielectric layer is formed between the target electrode and the sensing electrode;
   the driving electrode comprises one or more driving electrodes, is connected to the second level driver and is positioned below the sensing electrode, wherein a dielectric layer is formed between the driving electrode and the sensing electrode, and a driving capacitance is formed between the driving electrode and the sensing electrode;
   the first level driver is connected to a first level control signal;
   the second level driver is connected to a second level control signal and the driving electrode;
   the first port of the first initialization switch is connected to the sensing electrode, and a second port of the first initialization switch to the first reference level;
   the first reference level is connected to the second port of the first initialization switch;
   the first port of the charge transfer switch is connected to the sensing electrode;
   the first level control signal outputs to a sensor ground inverse AC components of two levels;
   wherein the first level driver further comprises a signal converter and a driving circuit, the outputs from the first level control signal go to a ground level via the converter and the driving circuit sequentially.

2. The capacitive fingerprint sensor of claim 1, wherein the first level driver outputs a level V11 when the first level control signal is low, and outputs a level V12 when the first level control signal is high.

3. The capacitive fingerprint sensor of claim 1, wherein the second level driver outputs a level V21 to the driving electrode when the second level control signal is low, and outputs a level V22 to the driving electrode when the second level control signal is high.

4. The capacitive fingerprint sensor of claim 1, wherein the second level driver outputs a level V21 to the driving electrode.

5. The capacitive fingerprint sensor of claim 1, further comprising an integrating capacitor, a second initialization switch and a second reference level,
the integrating capacitor comprises one capacitor or a plurality of capacitors connected in parallel, and is connected to a first port of the second initialization switch, a second port of the charge transfer switch;
the first port of the second initialization switch is connected to the integrating capacitor, and a second port of the second initialization switch to the second reference level;
the second reference level is connected to the second port of the second initialization switch; and
the second port of the charge transfer switch is connected to the integrating capacitor.

6. The capacitive fingerprint sensor of claim 5, further comprising a comparator and a third reference level, wherein: a first input terminal of the comparator is connected to the integrating capacitor, a second input terminal of a comparator to the third reference level, and an output terminal of the comparator is an output terminal of the sensor; the integrating capacitor is connected to the first input terminal of the comparator, and the third reference level is connected to the second input terminal of the comparator.

7. The capacitive fingerprint sensor of claim 6, wherein, when an array of sensors is formed, each unit circuit is formed by the target electrode, the sensing electrode, the driving electrode, the first level driver, the second level driver, the first initialization switch and the first reference level and a reused circuit is formed by the integrating capacitor, the second initialization switch, the second reference level, the charge transfer switch, the comparator and the third reference level.

8. The capacitive fingerprint sensor of claim 6, wherein, when an array of sensors is formed, each unit circuit is formed by the target electrode, the sensing electrode, the driving electrode, the first level driver, the second level driver, the first initialization switch, the first reference level and the charge transfer switch and a reused circuit is formed by the integrating capacitor, the second initialization switch, the second reference level, the comparator and the third reference level.

9. The capacitive fingerprint sensor of claim 8, wherein, when the array of sensors is formed, each unit circuit is formed by the target electrode, the sensing electrode, the driving electrode, the first level driver, the second level driver, the first initialization switch, the first reference level and the charge transfer switch, a primary reused circuit is formed by the integrating capacitor, the second initialization switch and the second reference level, and a secondary reused circuit is formed by the comparator and the third reference level.

10. The capacitive fingerprint sensor of claim 9, wherein the secondary reused circuit comprises the comparator paired with the third reference level or a plurality of comparators paired with respective third reference levels; and when the secondary reused circuit comprises a plurality of the comparators paired with the respective third reference levels, the respective third reference levels are different from each other.

11. The capacitive fingerprint sensor of claim 1, wherein the first level driver further comprises a phase inverter and a sensor ground level input terminal, the first level control signal is connected to an input terminal of the phase inverter; an output terminal of the phase inverter to an input terminal of the signal converter; an output terminal of the signal converter to a control terminal of the driving circuit; an output terminal of the driving circuit to the sensor ground level input terminal.

12. A capacitive fingerprint sensor, comprising: a sensing electrode, a driving electrode, a first level driver, a second level driver, a first initialization switch, a first reference level, an integrating capacitor, a second initialization switch, a second reference level and a charge transfer switch, wherein:
the sensing electrode comprises one or more sensing electrodes, and is connected to a first port of the first initialization switch and a first port of the charge transfer switch;
wherein a target capacitance is formed between a target electrode and the sensing electrode, the target electrode is a surface of a target to be measured and is positioned above the sensing electrode, wherein the target electrode is suspended in the air or grounded and a dielectric layer is formed between the target electrode and the sensing electrode;
the driving electrode comprises one or more driving electrodes, is connected to the second level driver and is positioned below the sensing electrode, wherein a dielectric layer is formed between the driving electrode and the sensing electrode, and a driving capacitance is formed between the driving electrode and the sensing electrode;
the first level driver is connected to a first level control signal;
the second level driver is connected to a second level control signal and the driving electrode;
the first port of the first initialization switch is connected to the sensing electrode, and a second port of the first initialization switch to the first reference level;
the first reference level is connected to the second port of the first initialization switch;
the integrating capacitor comprises one capacitor or a plurality of capacitors connected in parallel, and is connected to a first port of the second initialization switch, a second port of the charge transfer switch and a first input terminal of a comparator;
the first port of the second initialization switch is connected to the integrating capacitor, and a second port of the second initialization switch to the second reference level;
the second reference level is connected to the second port of the second initialization switch; and
the first port of the charge transfer switch is connected to the sensing electrode, and the second port of the charge transfer switch to the integrating capacitor;
the first level control signal outputs to a sensor ground inverse AC components of two levels;
wherein the first level driver further comprises a signal converter and a driving circuit, the outputs from the first level control signal go to a ground level via the converter and the driving circuit sequentially;
wherein the first initialization switch, the second initialization switch, the charge transfer switch, the first level control signal and the second level control signal are controlled according to the following control sequence:

Step 1: turning on the first initialization switch, turning off the charge transfer switch, turning off the second initialization switch, setting the first level control signal to low and setting the second level control signal to low;

Step 2: turning on the second initialization switch;

Step 3: turning off the second initialization switch;

Step 4: turning off the first initialization switch;

Step 5: setting the first level control signal to high and setting the second level control signal to high;

Step 6: turning on the charge transfer switch;

Step 7: turning off the charge transfer switch;

Step 8: setting the first level control signal to low and setting the second level control signal to low;

Step 9: turning on the first initialization switch;

Step 10: returning to Step 4.

13. The capacitive fingerprint sensor of claim 12, wherein the control sequence includes an initialization stage consisting of Steps 1-3 and a charge transfer stage consisting of Steps 4-10.

14. The capacitive fingerprint sensor of claim 13, wherein a potential of the integrating capacitor changes unidirectionally in the charge transfer stage.

15. The capacitive fingerprint sensor of claim 14, further comprising a comparator and a third reference level, a first input terminal of the comparator is connected to the integrating capacitor, a second input terminal of the comparator to the third reference level, and an output terminal of the comparator is an output terminal of the sensor; and the third reference level is connected to the second input terminal of the comparator; wherein the potential of the integrating capacitor changes unidirectionally; and when the potential of the integrating capacitor changes from a level higher than the third reference level to a level lower than the third reference level or changes from a level lower than the third reference level to a level higher than the third reference level, an output of the comparator is inverted and a sensor output is generated.

16. The capacitive fingerprint sensor of claim 12, wherein the first level driver further comprises a phase inverter and a sensor ground level input terminal, the first level control signal is connected to an input terminal of the phase inverter; an output terminal of the phase inverter to an input terminal of the signal converter; an output terminal of the signal converter to a control terminal of the driving circuit; an output terminal of the driving circuit to the sensor ground level input terminal.

* * * * *